Dec. 26, 1933.   J. H. WALDRON   1,940,983
ADJUSTABLE PIPE JOINT CLAMP
Filed April 12, 1933
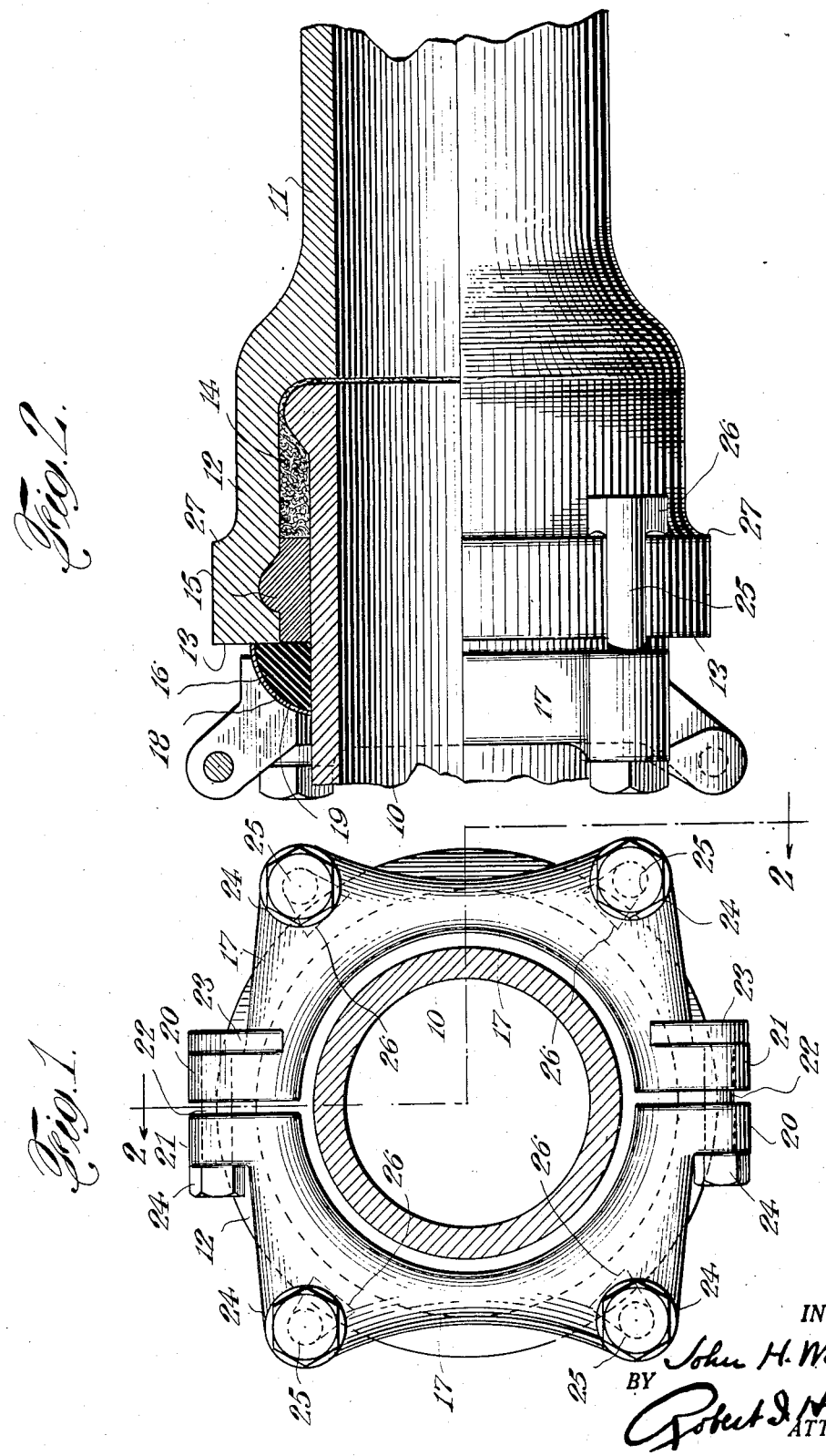
INVENTOR.
John H. Waldron
BY
Robert J. Hulsizer
ATTORNEYS.

Patented Dec. 26, 1933

1,940,983

UNITED STATES PATENT OFFICE 1,940,983

ADJUSTABLE PIPE JOINT CLAMP

John Henry Waldron, Flushing, N. Y.

Application April 12, 1933. Serial No. 665,745

1 Claim. (Cl. 285—119)

This invention relates to an adjustable pipe clamp and has particular reference to an adjustable clamp for pipe joints of the type in which fluids such as gas are transferred.

The main object of the invention is to provide a simple and efficient joint clamp which will efficiently seal the joint from leakage and adapt itself to slight variations in pipe diameter.

A further object is to provide a simple and efficient joint clamp which can be quickly and easily applied and removed without the necessity for skilled workmen in the application of it.

A further object is to provide a simple and efficient joint clamp which can be quickly applied to exert a sealing force on the joint in a plurality of directions whereby slight displacements of the joint in more than one direction will not disturb the effective seal.

Further and more specific objects, features and advantages will more clearly appear from a consideration of the specification hereinafter taken in connection with the accompanying drawing which forms part of the specification and which illustrates a present preferred form of the invention.

Briefly considered and in general terms the invention herein includes a multi-section clamp adapted to be disposed in contact with a sealing ring for a pipe joint and provided with means whereby the sections can be adjusted longitudinally of the pipe to produce a longitudinal pressure on the sealing unit and also provided with independent means whereby the sections can be adjusted transversally of the pipe to produce a transverse or radial pressure on the sealing ring. The effective component of these two pressures on the ring itself is to more effectively press it into position against the face of the joint and seal the same. In the ordinary pipe joint of the kind herein considered one section of the pipe fits into another section of pipe which is provided with a flared bell-shaped end. This results in the end face of the bell section forming a shoulder. The usual custom is to force packing between the two telescoping sections of pipe and then pour molten metal such as lead in to fill up the opening and close the same. This leaves the face of the joint flat with the shoulder above-mentioned and would ordinarily be sufficient except for the fact that vibrations and displacements to which the pipe may be subjected tend to disturb the effectiveness of the seal and also due to the fact that liquids or gases which pass through the pipe sometimes have a deleterious effect on the packing causing it to deteriorate and thus resulting in a tendency to leak.

To make the joint more effectively sealed, I provide a flexible packing ring which is placed around the smaller pipe section and slid into position in the corner around the smaller pipe section and against the adjacent bell end of the other section. This would bring the ring into intimate contact with the face of the lead or metal seal. To merely create a longitudinal pressure on the ring has been proven to be insufficient. It is also necessary to create a transverse pressure thereon which will hold it firmly sealed against the smaller pipe section as well. Therefore, I provide a sectional clamping member from which extend means to engage with the bell end of the larger pipe section to create the necessary longitudinal or axial pull on the section with the consequent longitudinal pressure against the sealing unit. I also provide the clamping member in sections with adjustable means between the sections so that they can be drawn together or contracted in a radial or diametrical manner transverse of the smaller pipe to create on the sealing ring the necessary and highly desirable transverse pressure which insures a certain and effective seal between the ring and the smaller pipe. The vectorial resultant of these two forces is a force diagonally directed inward to the center of the angle directly against the metal seal. By having the clamping sections adjustable diametrically it is also possible to use these clamps on pipes which may vary slightly in diameter as is often the case in using commercially manufactured pipes.

Preferably I also interpose a weather-proof rust resisting sheet of metal between the clamp section and the flexible sealing unit tending to efficiently enclose the sealing ring to prevent the deleterious action of the weather and moisture, dust, and dirt on said ring.

The preferred present form of the invention is shown in the drawing, of which:

Fig. 1 is an end view of the joint showing the inner pipe in section; and

Fig. 2 is a longitudinal partial section and elevation taken on the line 2—2 of Fig. 1.

In the drawing, the present preferred form of the invention shows it as applied to a pipe joint in which there are two pipe elements 10 and 11. The element 10 fits within the element 11, the latter element being provided at its end with a flared bell portion 12 providing a shouldered annular surface 13 surrounding the adjacent enclosed pipe section 10.

Ordinarily in most joints of this kind packing material such as 14 is forced in between the pipe sections and may be of jute, hemp, rope, cord or other desirable packing material. Preferably also when this packing material 14 has been inserted a sealing ring 15 is formed around and outside of the packing by pouring any molten material such as lead which will solidify and seal the packing in place.

Due to the disintegrating effect of the material which passes through the pipe such as water, acids, gases, and the like, the packing material gradually becomes disintegrated and the lead seal will be made ineffective by reason of the relative displacement of the pipe sections with consequent leakage. To maintain the sealed condition of the joint in spite of these unavoidable conditions, I provide a further sealing ring 16 preferably of very flexible material such as rubber having a flat packing surface adjacent the shoulders 13 and the lead seal ring 15 and the adjacent surface of the pipe 10 but having preferably a curved arcuate surface adjacent to any member which is to engage this sealing ring 16 to clamp it in position.

I preferably employ a clamping member in the form of a two-piece casting 17 having an inner curved circular shaped groove or depression 18 therein of a shape and curvature similar to the curvature of the outer surface of the auxiliary sealing ring 16. This clamping element when placed in position as shown in the drawing will, therefore, press firmly and continuously against substantially the entire outer surface of the sealing ring. In most instances, I desire to provide an interposed metallic shell or plate such as 19 between the sealing ring and the clamping element. This metallic sheet is preferably of rust resisting material so that the sealing ring 16 is protected as much as possible from the detrimental effects of moisture and weather. Preferably this interposed weather-proof sheet is of the proper dimensions to substantially cover the sealing ring while not in any way preventing proper pressure being applied thereto by the clamp. The two sections of the clamping element have aligned lugs such as 20 and 21 which are suitably bored to permit connecting bolts 22 to be operated to pull them together. These connecting bolts are provided with flared heads 23 on one end thereof which engage with adjacent surfaces of the castings to prevent the bolts from being turned while the nuts 24 are being tightened up to clamp the elements in position on the sealing ring.

The clamping elements 17 are fastened to the pipe in a further manner by the provision of lugs such as 24 at spaced points thereon, these lugs being bored to receive bolts such as 25. One end of these bolts 25 is provided with offset flanges 26 to engage back of the shoulder 27 formed on the bell 12 to provide a surface against which the bolts 25 may be anchored to permit the clamping elements or castings to be longitudinally adjusted against the shoulder 13.

It will thus be seen that after the packing 14 and the lead seal 15 have been inserted, it is a simple matter to apply the flexible seal ring 16 and then place the clamping elements 17 in position. The bolts 22 are tightened up in a preliminary fashion and then the bolts 25 are tightened up to bolt the clamping elements as tightly as necessary longitudinally against the sealing ring 16. After this the bolts 22 are tightened up as much as possible to exert a pull or pressure on the sealing ring transverse to the pipe section. Due to the combined transverse compression on the bolts 22 and the longitudinal pull on the bolts 25 it will be seen that the combined component of these forces will be inserted along a line midway between the horizontal direction of the pipe and the transverse direction thereto. This force will be exerted inwardly on the sealing ring and will make the sealing effect thereon much more effective than would either a transverse force or a horizontal force alone. By providing the clamping device with this transverse adjustment it is also possible to adapt the clamping device to pipes which may vary slightly in diameter and still achieve the desired effect regardless of this slight variation in size. Iron pipes although substantially of a definite dimension are never found to be of the exact size and consequently this clamp provides sufficient adjustment of the ring to permit it to be applied to the pipe even under these conditions of variations. It is to be understood, of course, that as the size of the pipe increases the number of sections in the multi-sectional clamp may be increased as circumstances require without departing in any way from the principle of the invention as shown in the two piece section disclosed and described therein.

It is, therefore, clear from a consideration of the drawing in connection with this description that a multi-piece clamp applied to the joint in the manner indicated tends to exert proper sealing pressure on the ring not only longitudinally along the pipe but transversally thereof to give a resultant compression force, the direction of which is along a line which will most effectively seal the surfaces where leakage is most likely to occur under the conditions indicated. By having this double adjustment it is also possible to accommodate variations in pipe sizes within reasonable limits for any specified size of pipe.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claim.

What is claimed, is:

Means for sealing a leaking bell and spigot pipe joint, comprising a split clamping ring having a gasket receiving recess in the inner wall thereof, a gasket seated in said recess, radially outwardly extending lugs on said ring, bolts having means for engaging behind the end flange of a conventional bell-end pipe and carried by said lugs, other radially outwardly extending lugs at the ends of each section of said ring and means engaging said last mentioned lugs for drawing the ring sections toward each other after the gasket has been brought into sealing engagement with the bell end whereby the gasket is brought into sealing engagement with the wall of the inserted spigot.

JOHN HENRY WALDRON.